United States Patent [19]

Tsutsumi

[11] Patent Number: 4,740,674
[45] Date of Patent: Apr. 26, 1988

[54] POINTED HEAT-GENERATING DEVICE

[75] Inventor: Shigeru Tsutsumi, Yamagata, Japan

[73] Assignee: Sanri Kabushiki Kaisha, Tokyo, Japan

[21] Appl. No.: 941,305

[22] Filed: Dec. 11, 1986

[30] Foreign Application Priority Data

Dec. 16, 1985 [JP] Japan .................. 60-281082

[51] Int. Cl.⁴ .............................................. H05B 3/06
[52] U.S. Cl. ...................... 219/523; 338/217
[58] Field of Search .............. 219/523, 421; 338/217, 338/218; 222/146.1, 146.5

[56] References Cited

U.S. PATENT DOCUMENTS 2,473,402 6/1949 Wood .................................. 219/523
3,927,301 12/1975 Heuel .................................. 219/523

FOREIGN PATENT DOCUMENTS 694904 8/1940 Fed. Rep. of Germany ...... 219/523

Primary Examiner—Harold Broome
Attorney, Agent, or Firm—Thomas R. Morrison

[57] ABSTRACT

A pointed heat-generating device includes a fine and small heat-generating coil which gradually changes its winding diameters or winding density. The pointed heat-generating device is fixed to a heat-generating front part of a projectile-shaped heat-generator main body. The thermal distance between the heat-generating coil in the pointed heat-generating device and the tapered peripheral surface of the heat-generating front part is shortened and maintained constant over its the whole area.

3 Claims, 3 Drawing Sheets

POINTED HEAT-GENERATING DEVICE

BACKGROUND OF THE INVENTION (1) Field of the Invention

This invention relates to a pointed, small-sized and highly precise heat-generating device used as a tip heater for molding synthetic resin.

(2) Description of the Prior Art

In the type of pointed heat-generating devices existing presently, there is disclosed a Japanese Patent Laid Open No. 59-180308 registered by the present applicant.

Referring to FIG. 5 and FIG. 6, 1 indicates a projectile-shaped heat-generator main body comprising a cylindrical metal outer tube 2 and a pointed conical heat-generating front part 3 provided in the front area. This pointed heat-generating front part 3 is provided with a through hole 4 on its central axis. A heat generating means 5, for example, of nichrome wire is placed through hole 4 until one end of the wire reaches the tip of the heat-generating front part 3 and is welded thereto. An alloy part X of antifriction material of the weld filler material is shaped to conform to the shape of the pointed heat-generating front part 3.

The heat-generating means or heater 5 has a coiled heat-generating part 5c and extension wires 5a, 5b extending from its ends. The beater 5 utilizes a nichrome wire of 0.1–0.6 mm in diameter, formed in a coil with a winding diameter of about 1.3–2.0 mm. 6 indicates a ceramic column inserted and fixed locally to the coiled heat-generating part 5c of said heater, effectively insulating the heater from other members as needed. The heater 5 extends close to and fixed to the tip of the through hole 4 of the projectile-shaped heat-generating main body. That is, to the tip of the conical heat-generating front part 3. 7 indicates one extension of the heater 5 pierced longitudinally along through hole 4 of the heat-generating main body #1. Further, the other extension line 5b of the heater 5, similarly is thermally welded to the end of the conical heat-generating front part 3, forms a part of the alloy part X of antifriction material which is antifrictional in the same degree as the main body #1 and forming a grounds the end of the heater 5.

As constructed above, the heater 5 is heated by electric current passing between the extension line 7 of the heater 5 and the projectile heat-generating mainbody 1. The heat moves immediately and responsively to the conical heat-generating front part 3. By radiating outwardly from the conical heat-generating front part 3, the heat thermally melts the thermoplastic synthetic resin in a gate area leading to a cavity. Cooling and solidification of the thermoplastic synthetic resin in the gate area leading to the cavity can be achieved by stopping the electric current to the heater 5, thereby stopping immediately heat generation in the heat-generating part 5c, heat transmission to the conical heat-generating front part 3, and radiation of heat from said part 3 to the thermoplastic synthetic resin.

Thus it is possible for us to manipulate injection molding by passing electricity intermittently to the heater 5, thereby intermittently heating and melting and cooling and soidifying the thermoplastic synthetic resin in the vicinity of a gate, and accordingly opening and closing the gate.

Further, although the preceding embodiment is constructed with a body heater 8 coiled in the inside of the heat-generating mainbody 1 and insulated on both sides by the insulation pipes 9 and 10, other types of injection molding devices exist without a body heater 8 in the heat-generating mainbody 1. These devices may substitute a coiled heater in the area surrounding the runner (not shown) and thereby heat and fuse the thermoplastic synthetic resin in the same manner.

In the preceding embodiment, a fine diameter wire, placed as close as possible to the extremity, is used for the heater 5 and the coiled heat-generating part 5c has the same diameter and same pitch along its entire length. This makes the distance between the tapered peripheral surface Y and the heater 5 gradually shorter toward the tip and gradually longer toward to the rear portion.

Accordingly, the prior art device fails to provide a quick response. Heat conveyed from the coiled heat-generating part 5c of the heater 5 to the tapered surface Y is variable depending upon the point on the tapered surface Y. Thus the time required to attain the necessary temperature throughout the entire pointed heat-generating front part 3 is delayed.

Further, although the precedent embodiment permits a saving in electric consumption by using a fine heater coiled in a small diameter and a smaller electric controller, it is possible to reduce electric consumption further and to make the controller smaller by improving responsiveness of the heater even if the wire diameter is somewhat enlarged.

SUMMARY OF THE INVENTON

In an attempt to solve the above problem and achieve the above object, this invention provides a pointed heat-generating device with a heater having a fine, highly effective heat-generating coil having comparatively larger-diametered wire with a variable coil diameter. That is, shortening the thermal distances between the heat-generating wire and tapered peripheral surface of a pointed heat-generating front part, thereby improving the response of temperature changes in the heat-generating front part by energizing and de-energized of the heater. Thus improved responsiveness, decreased electric consumption and a smaller controller are enabled.

DETAILED DESCRIPTION OF THE INVENTION

In the following is explained the embodiments of this invention by reference to the drawings.

Figure 1:
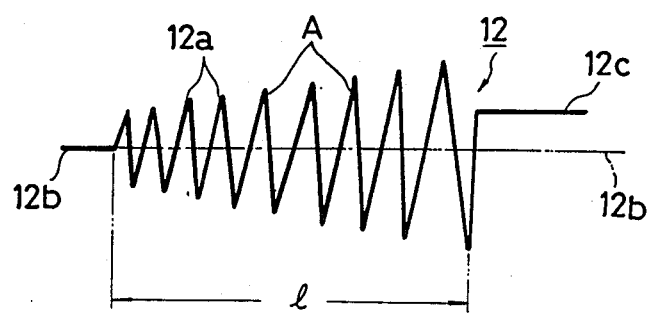
FIG. 1 and FIG. 2 are enlarged side views showing two examples of heaters used for the pointed heat-generating device of this invention.
Figure 2:
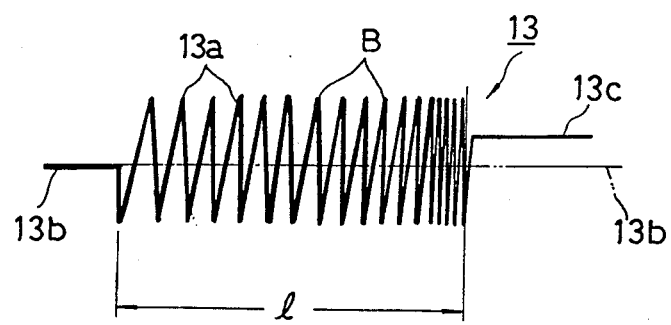

FIG. 1 and FIG. 2 are the drawings of two embodiments of heaters of a pointed heat-generating means of this invention. FIG. 1 is a heater 12 formed of a coiled heat-generating part 12a coiled in a conical form A of a nichrome wire of diameter from 0.2–0.3 mm over the short length 1 and coiled in a diameter variable ranging from 1.0–2.0 mm to 1.8–4.0 mm at the same pitch and two extensions 12b and 12c.

Further in a manner similar to a prior art, one 12c of two extensions 12b and 12c is led outside by being connected to a lead 7. (FIG. 3) The other extension 12b is connected electrically to any part of the heat generating main body. For example, similarly as shown in a prior art, the heater 12 may be grounded to the end of the conical heat-generating front part of welding thereto and forming an alloy portion X as antifrictional as the main member material in the same manner as in the prior art embodiments of FIG. 3 and FIG. 4.

Another alternative for grounding the forward extension 12b could be an extension 12b, shown in a dotted line led out backward by a lead connected thereto which passes through the central part of the coiled heat-generator 12 for connection to a lead in the same manner as in the case of the extension 12c (not shown in a drawing). Extension 12c may alternatively be brazed to any place of heat-generating front part 3.

The heat-generating means 13 shown in FIG. 2, is constructed of a heat-generator 13a coiled with the same diameter but with a winding density increasing gradually from the tip to the rear as indicated at B.

Further the constructions of FIG. 1 and FIG. 2 are not the only designated forms, and they could be conical or columnar, and the diameter of the winding form of FIG. 2 could be changed to a conical form.

Figure 3:
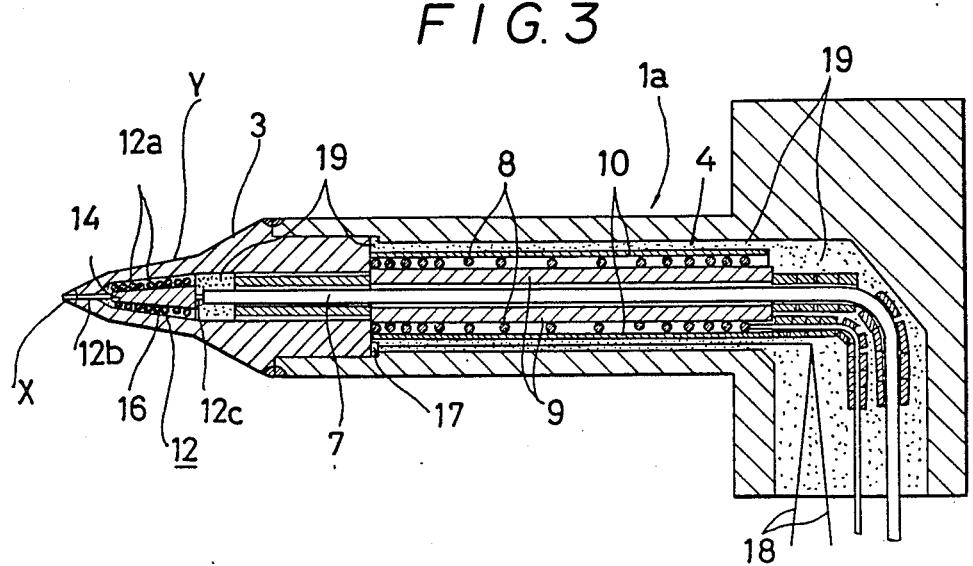
FIG. 3 is a vertical section view indicating one embodiment of the pointed heat-generating device of this invention.
Figure 4:
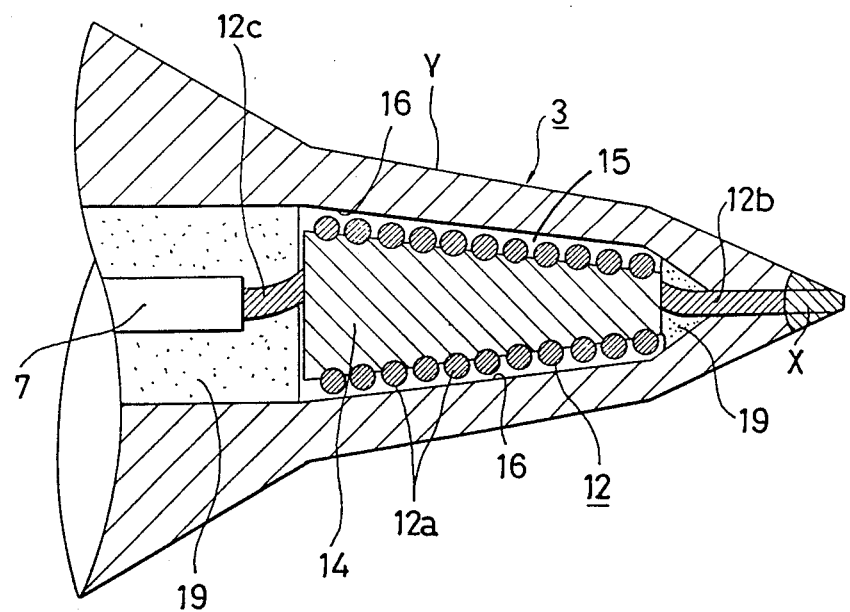
FIG. 4 is an enlarged vertical view of the device of FIG. 3.
Figure 5:
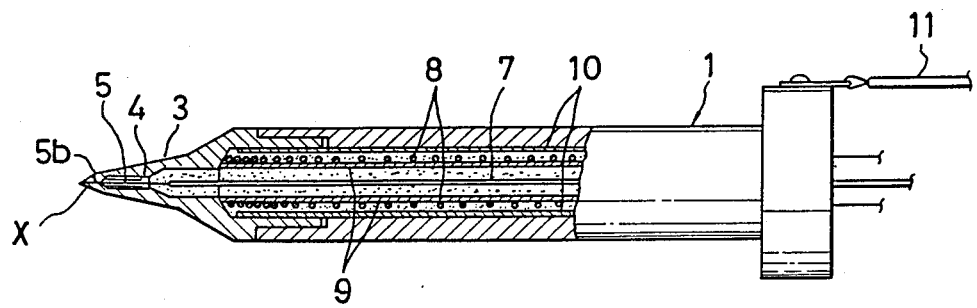
FIG. 5 is a side view, partially cutaway, of a device of the prior art.
Figure 6:
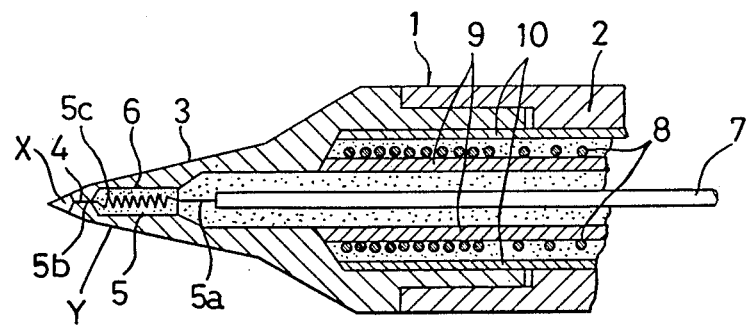
FIG. 6 is a partially enlarged vertical view of the device of FIG. 5.

Next the embodiment utilizing the heat-generator 12 shown in FIG. 1 is explained in accordance with the drawings in FIG. 3 and FIG. 4.

14 indicates a ceramic column with a conical heater cavity 15 on which heat-generator 12 is wound fixed inside the conical heat-generating front part 3 of the heat-generating main body 1 and firmly fixed therein by use of an adhesive such as a product named Aron ceramic. Further, since the heat-generator 12 is retained in a conical form by the ceramic column 14 and the internal peripheral wall 16 is cut in the same form as the ceramic column 14, the thickness of material between the heat-generating front part 3 and the tapered peripheral surface Y is constant throughout the whole area and, as a result, the thermal distance is constant over the whole area.

In this embodiment, the same numerals are assigned to the parts identical or corresponding to the same parts in prior embodiment. Their detailed explanations are omitted here.

Further, the numeral 17 indicates a sensor, the numeral 18 indicates an extension, 19 indicates a fixing powder in the throughhole 4.

In the same way as the preceding embodiment, on applying electricity to the heater 12 from an appropriate controller, heat from the coiled conical heat-generator 12a moves immediately to the conical heat-generating front part 3 thereby heating its outer area. The constant distance between the coiled heat-generator and the tapered peripheral surface Y of the heat-generating front part 3 permits heat from the heat-generator 12 to heat and fuse instantly and constantly the thermoplastic synthetic resin in the gate leading to a cavity.

Further, when the electricity to the heat-generator 12 being stopped, heat-generator from the heat-generator 12 stops immediately and heat transmission to the conical heat-generating front part 3 stops and heat radiation from the front part 3 to the thermoplastic synthetic resin stops and consequently cooling and solidification of the resin follows.

In this way, the desired injection molding operation could be realized by operating discontinuous electric application to the heat-generator 12 and heating and fusing intermittently the thermoplastic synthetic resin in the gate area leading to a cavity and cooling and solidifying the resin and opening and closing the gate.

Further it is possible to control the temperature of the heat-generating means 13 shown in FIG. 2 extremely responsively by utilizing an insulator made of ceramic material in the heat-generating front part 3 as shown in FIG. 3 and FIG. 4 for forming the heat-generating front part and shortening and maintaining constant the thermal distance in the whole area between the heat-generating means and the tapered peripheral surface Y of the heat-generating front part 3.

According to this invention, the present invention has an advantage that it is possible to make the range of temperature change of the tapered peripheral surface sensitive to a short intermittent electric application to the heater, by having the heater to heat locally the heat-generating front part of the heat-generating main body, and the heater having a coiled shaped similar to the tapered peripheral form with the winding diameter and the winding density changing gradually and with the heat distribution changing and with the thermal distance between the heater and said tapered peripheral surface shortened and same in the whole area.

Further this invention has another advantage enabling use of a controller of smaller electric power consumption. For example, 2 V, 2 A, 4 W is sufficient because a nichrome wire between 0.2 mm–0.3 mm, a little thicker than fine size, is satisfactory. The durability of the heat-generator is lengthened thereby and yet the responsiveness of operation to the short intermittent control of electricity is retained.

What is claimed is:

1. A pointed heat-generating device comprising: a front part, said front part having a generally conically tapered outer peripheral surface tapering from larger at a rear end to smaller at a front end, a heater cavity within said front part, a heat-generating means including a coil of resistive material in said heater cavity, said coil reducing in diameter from a rear end to a front end to form a generally conical shape, said conical shape being generally parallel to said conically tapered outer peripheral surface and tapering from larger at a rear end to smaller at a front end, said front part being affixed to a front of a projectile-shaped main body, and the change in diameter of said coil and the taper of said tapered outer peripheral surface being selected to maintain a thermal distance between said coil and said outer peripheral surface substantially constant over the whole area of said outer peripheral surface.

2. A pointed heat-generating device according to claim 1, wherein said heater cavity includes a conical insulation, said conical insulation including a helical groove in a surface thereof, said coil of resistive material being embedded in said helical groove.

3. A pointed heat-generating device comprising:
a front part;
said front part having a generally conically tapered outer peripheral surface;
a heater cavity within said front part;
a heat-generating means including a coil of resistive material in said heater cavity;

said coil reducing in winding density from a rear end to a front end to form a generally cylindrical shape;
said front part being affixed to a front of a projectile-shaped main body; and
the reduction in winding density of said coil and the taper of said tapered outer peripheral surface being selected to maintain a thermal distance between said coil and said outer peripheral surface substantially constant over the whole area of said outer peripheral surface.

* * * * *